(12) United States Patent
Lee

(10) Patent No.: US 8,049,909 B2
(45) Date of Patent: Nov. 1, 2011

(54) IMAGE FORMING APPARATUS CAPABLE OF PERFORMING SKIP COPY AND IMAGE FORMING METHOD USING THE SAME

(75) Inventor: Jae-yoon Lee, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1261 days.

(21) Appl. No.: 11/687,976

(22) Filed: Mar. 19, 2007

(65) Prior Publication Data

US 2008/0043280 A1 Feb. 21, 2008

(30) Foreign Application Priority Data

Aug. 18, 2006 (KR) .................. 10-2006-0078114

(51) Int. Cl.
*G06F 15/00* (2006.01)
*G06K 9/00* (2006.01)

(52) U.S. Cl. ...................................... 358/1.13; 382/100

(58) Field of Classification Search .............. 358/1.13, 358/1.14, 1.15, 1.1, 1.9, 3.28, 538, 1.16, 358/1.18, 3.29, 468, 486, 450; 382/100, 382/240, 306, 244; 355/40, 27, 41, 50; 399/55, 399/372, 83

See application file for complete search history.

(56) References Cited

U.S. PATENT DOCUMENTS

| 6,236,770 | B1 | 5/2001 | Hsieh et al. | |
| 6,640,010 | B2 | 10/2003 | Seeger et al. | |
| 6,982,801 | B1* | 1/2006 | Saito | 358/1.15 |
| 2006/0001919 | A1 | 1/2006 | Owens et al. | |
| 2007/0056034 | A1* | 3/2007 | Fernstrom | 726/20 |

FOREIGN PATENT DOCUMENTS

JP 2002-51207 A 2/2002

OTHER PUBLICATIONS

Office Action (issuance date: Aug. 9, 2010) issued by the Chinese Patent Office for Chinese Patent Application No. 2007100110294.3 which was filed on Jun. 8, 2007.
"Operating Instructions: Copy Reference, Aficio 2051/2060/2075," pp. i-viii, 58-64, dated 2004, Ricoh LTD.
Chinese Office Action issued Apr. 7, 2011 in corresponding Chinese Patent Application 200710110294.3.

\* cited by examiner

*Primary Examiner* — Saeid Ebrahimi Dehkordy
(74) *Attorney, Agent, or Firm* — Staas & Halsey LLP

(57) ABSTRACT

An image forming apparatus capable of performing a skip copy and an image forming method using the same, the image forming apparatus including: an image forming unit to copy a document, and a control unit to control the image forming unit to skip a designated region of the document when the image forming unit copies the document. Accordingly, resources, such as ink, and time can be preserved.

34 Claims, 7 Drawing Sheets

FIG. 4A

Demographic data

According to the research conducted by the Ministry of Statistics, urbanization of Korea has increased by 1.5% since 2000.

— C

According to the research, the population of suburban areas of Korea has also increased since 2000, but the rural areas have continuously decreasing population.

Meanwhile, among the 3575 cities and towns of Korea, Taean-eup of Hwasung city has the largest population (1240000), and Naewha-dong of Kimhae city is the second largest by 90000, and Sinhyun-eup of Gurje city is the third largest by 340000.

FIG. 4B

Demographic data

According to the research conducted by the Ministry of Statistics,
urbanization of Korea has increased by 1.5% since 2000.

— D

According to the research, the population of suburban areas of Korea has also
increased since 2000, but the rural areas have continuously decreasing population.

Meanwhile, among the 3575 cities and towns of Korea, Taean-eup of Hwasung city
has the largest population (1240000), and Naewha-dong of Kimhae city is the second
largest by 90000, and Sinhyun-eup of Gurje city is the third largest by 340000.

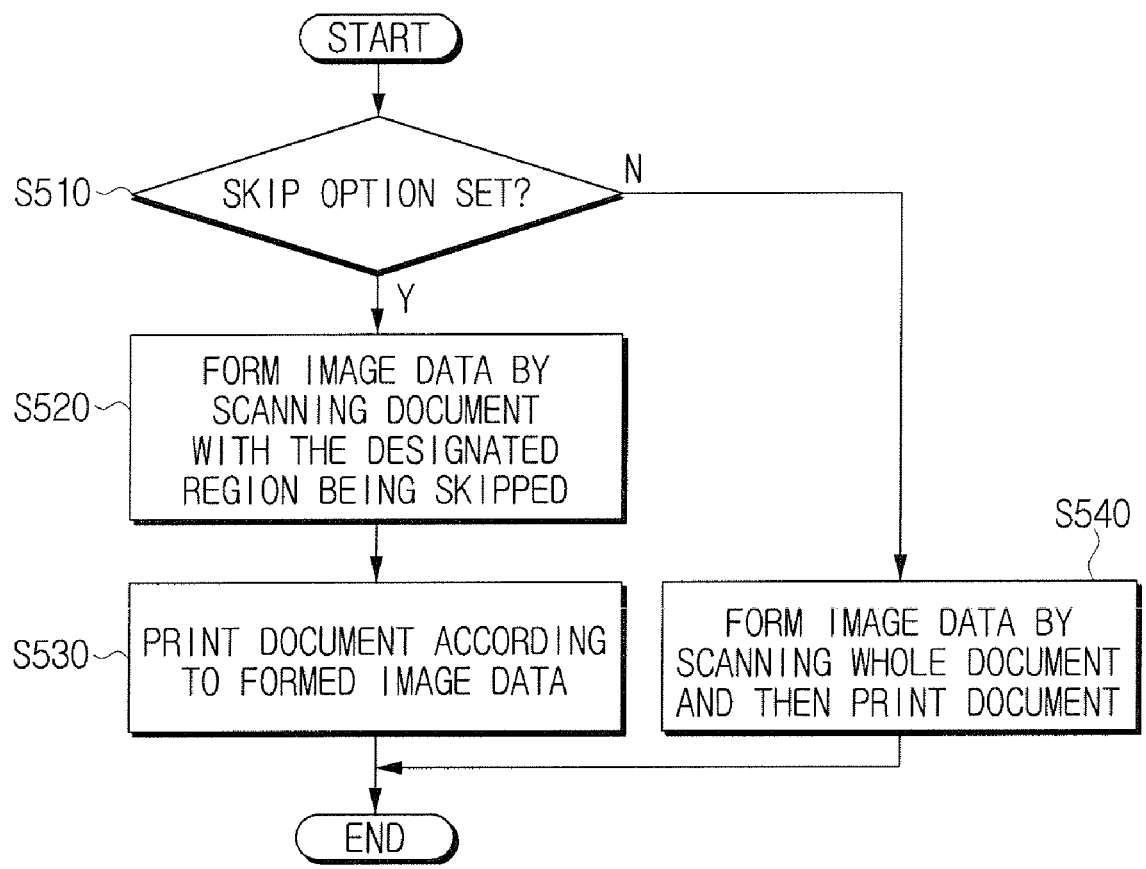

IMAGE FORMING APPARATUS CAPABLE OF PERFORMING SKIP COPY AND IMAGE FORMING METHOD USING THE SAME

CROSS-REFERENCE TO RELATED APPLICATION

This application claims the benefit under 35 U.S.C. §119 from Korean Patent Application No. 2006-78114, filed Aug. 18, 2006 in the Korean Intellectual Property Office, the disclosure of which is incorporated herein by reference.

BACKGROUND OF THE INVENTION

1. Field of the Invention

Aspects of the present invention relate to an image forming apparatus capable of performing a skip copy and an image forming method using the same. More particularly, aspects of the present invention relate to an image forming apparatus, and an image forming method using the same, that copies a document while skipping regions thereof not desired by a user.

2. Description of the Related Art

Generally, an image forming apparatus that can copy a document includes a document feeder mode classified into a flat bed mode and an auto document feeder mode. Such an image forming apparatus may be a copy machine or a multi-functional peripheral (MFP).

The flat bed mode is a mode in which a document is laid on a flat bed and is copied sheet-by-sheet. The auto document feeder mode is a mode in which a document is laid on an auto document feeder and automatically transferred to the flat bed sheet-by-sheet so that the document is continuously copied.

Meanwhile, when a user desires that a region of the document not be copied, then, conventionally, the region may be shielded with a white paper during the copying or scanned image data of the document may be converted through an image process device, such as a computer. However, shielding the region is only possible while copying the document in the flat bed mode, and not the auto document feeder mode. Furthermore, the copying of the document takes a long time since the user must separately carry out the shielding of the corresponding region.

When converting scanned image data of the document, several processes, including scanning the document, converting the scanned image data, and printing, must be performed, therefore resulting in an inconvenience to the user.

SUMMARY OF THE INVENTION

Aspects of the present invention provide an image forming apparatus capable of performing a skip copy and an image forming method using the same, which reduce a waste of resources, such as ink, and time.

According to an aspect of the present invention, there is provided an image forming apparatus comprising an image forming unit to copy a document, and a control unit to control the image forming unit to skip a designated region of the document when the image forming unit copies the document.

According to an aspect of the present invention, the image forming unit may comprise a scanning unit to scan the document to form image data, and a printing unit to print the image data.

According to an aspect of the present invention, the image forming apparatus may further comprise a display unit to display the image data if a document feeder mode is an auto document feeder mode, and an input unit to receive a designation of the designated region.

According to an aspect of the present invention, the control unit may control the scanning unit to skip the scanning process, from a point where the command to designate the skip region is primarily inputted to a point where the command to designate the skip region is secondarily inputted, in a state that the image data is displayed.

According to an aspect of the present invention, the display unit may display the scanning process of the document by applying a minimum resolution from among supportable resolutions.

According to an aspect of the present invention, the image forming apparatus may further comprise a display unit to display an image entirely scanned by the scanning unit, and an input unit to receive a designation of the designated region.

According to an aspect of the present invention, if a document feeder mode is a flat bed mode, the control unit may control the scanning unit to entirely scan the document to output the same to the display unit, and control the scanning unit to skip the scanning of the designated region of the image displayed on the display unit.

According to an aspect of the present invention, the display unit may display the entirely scanned image by applying a minimum resolution from among supportable resolutions.

According to an aspect of the present invention, the image forming apparatus may further comprise an input unit to set a scan option of the image forming unit such that if the scan option is a skip option to skip the designated region, the control unit may control the image forming unit to copy the document with the designated region being skipped.

According to an aspect of the present invention, the control unit may control the image forming unit to copy the document with the remaining regions surrounding the designated region being attached.

According another aspect of the present invention, there is provided an image forming method to copy a document, the method comprising: determining whether a skip option is set, if the skip option is set, forming image data by scanning a document, and printing the document according to the formed image data with a designated region being skipped.

According to an aspect of the present invention, the image forming method may further comprise, if the skip option is set, verifying a document feeder mode such that if the document feeder mode is an auto document feeder mode, displaying the image data, and forming the image data by performing the scanning and skipping the scanning process from a point where the command to designate the skip region is primarily inputted to a point where the command to designate the skip region is secondarily inputted while the image data is displayed.

According to an aspect of the present invention, the displaying of the image data may comprise displaying the image data by applying a minimum resolution from among supportable resolutions.

According to an aspect of the present invention, the image forming method may further comprise verifying a document feeder mode such that if the document feeder mode is a flat bed mode, entirely scanning and displaying the document, and if a region is designated on the displayed image which has been freely scanned, forming the image data by performing the scanning and skipping the scanning of the designated region.

According to an aspect of the present invention, the scanning and displaying of the document may comprise displaying the entirely scanned document by applying a minimum resolution from among supportable resolutions.

According to an aspect of the present invention, the printing of the document may comprise printing the document with the remaining regions surrounding the designated region being attached.

According to an aspect of the present invention, the image forming method may further comprise, if a skip option is not set, forming the image data by scanning the whole document and printing the whole document.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 4A and 4B are views illustrating copied documents according to an embodiment of the present invention;

FIG. 5 is a flowchart explaining an image forming method according to an embodiment of the present invention;

DETAILED DESCRIPTION OF THE EMBODIMENTS

Figure 1:
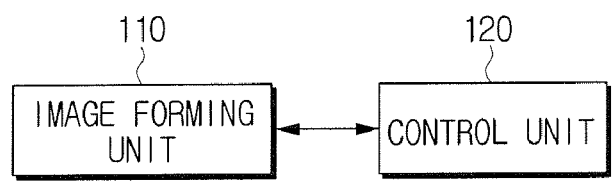
FIG. 1 is a block diagram illustrating an image forming apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating an image forming apparatus according to an embodiment of the present invention. Referring to FIG. 1, the image forming apparatus includes an image forming unit 110 and a control unit 120. The image forming apparatus can copy a document while omitting from the copying a region on which the copying is not desired by a user, or the image forming apparatus can copy the whole document.

The image forming unit 110 forms image data by scanning the document under the control of the control unit 120, with a designated region of the document being skipped. Then, the image forming unit 110 prints the image data. Here, the printed document is a document wholly or partly copied and output.

The control unit 120 controls the whole operation of the image forming apparatus. In particular, the control unit 120 controls the image forming unit 110 to scan and to copy the document, with the designated region being skipped. While not required in all aspects, the image forming apparatus can further include a printer to print the image, a copier, and/or a facsimile unit.

Figure 2:
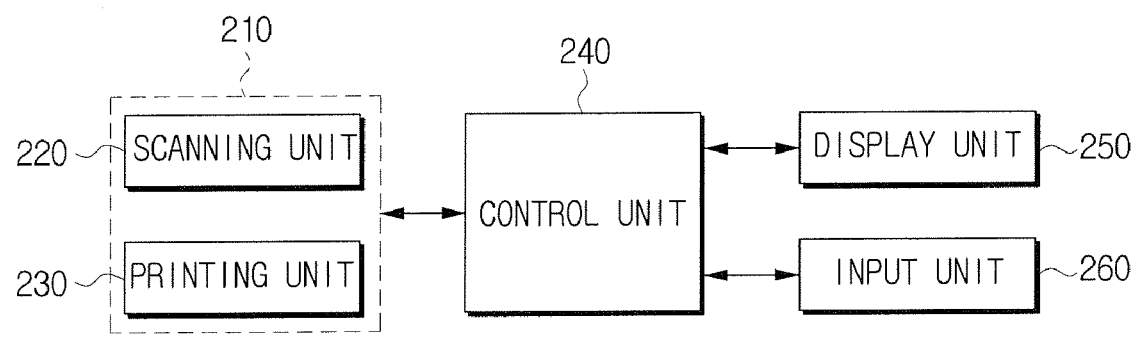
FIG. 2 is a block diagram illustrating an image forming apparatus according to another embodiment of the present invention.

FIG. 2 is a block diagram illustrating the image forming apparatus according to another embodiment of the present invention. Referring to FIG. 2, the image forming apparatus includes an image forming unit 210, a control unit 240, a display unit 250, and an input unit 260. The image forming unit 210 includes a scanning unit 220 and a printing unit 230.

The scanning unit 220 scans a document to form image data. By way of example, the scanning unit 220 has a CCD image sensor, a lens, and a light source, and is driven by a carriage return motor. The CCD image sensor has a photoelectric conversion unit (not shown) absorbing the light irradiated onto an object from the light source to generate electrons, a charge transmission unit (not shown) transmitting the charges generated from the photoelectric conversion unit to a signal detection unit (not shown), and the signal detection unit detecting a signal charge and converting the image information received by the photoelectric conversion unit into an electric signal. However, it is understood that according to other aspects, other types of image sensors (such as a CMOS image sensor) may be used, as well as other types of motors to drive the scanning unit 220.

The scanning unit 220 scans the document under the control of the control unit 240 to form the image data. The designated region of the document is skipped in the scanning and/or the printing. The printing unit 230 prints the document according to the image data formed by the scanning unit 220. The control unit 240 performs generally the same functions as the control unit 120 shown in FIG. 1.

More specifically, the control unit 240 controls the image forming unit 210 in order to copy the document, with the designated region being skipped, when a skip option is inputted through the input unit 260. If the skip option is not inputted, the image forming unit 210 controls the image forming unit 210 to print the entire document.

Furthermore, the control unit 240 verifies a document feeder mode of the document. That is, the control unit 240 verifies whether the document is loaded on an auto document feeder or a flat bed of the image forming apparatus, according to whether the cover (not shown) of the image forming apparatus is opened or closed. As a result, the control unit 240 sets the auto document feeder mode or the flat bed mode. However, it is understood that other mechanisms can be used to determined if the auto document feeder is used, such as a sensor on a feed tray or a switch.

If the document feeder mode is the auto document feeder mode, the control unit 240 controls the scanning unit 220 in such a way that the scanning unit 220 skips the scanning operation from a point where a command to designate a skip region is primarily inputted to a point where a command to designate a skip region is secondarily inputted. According to an aspect, a scanning procedure is displayed through the display unit 250. The command to designate the skip region is inputted through the input unit 260, and is inputted when a region of the document on which copying is not desired is designated.

More specifically, the control unit 240 stores the point where the command to designate the skip region is primarily inputted and the point where the command to designate the skip region is secondarily inputted, and recognizes the region from the point where the command to designate the skip region is primarily inputted to the point where the command to designate the skip region is secondarily inputted as the skip region. Accordingly, this region is the designated region in the auto document feeder mode. However, it is understood that according to other aspects, the number of points inputted to designate the designated region may vary.

If the document feeder mode is the flat bed mode, the control unit 240 controls the scanning unit 220 to freely scan the document. Also, according to an aspect, the control unit 240 may provide the display unit 250 with the freely scanned image. Furthermore, the control unit 240 may control the scanning unit 220 or the printing unit 230 to skip the designated region by a command to designate a skip region on the image displayed on the display unit 250.

The command to designate the skip region is inputted when a region of the freely scanned image on which copying is not desired is designated. Accordingly, this region is the designated region in the flat bed mode. According to an aspect of the invention, the designated region is inputted through the input unit 260 by dragging a cursor with, for example, a mouse. It is understood that, according to other aspects, the designated region may be set by inputting a number of points through the input unit 260 before or after the scanning unit 220 scans the document. Moreover, other mechanisms can be used to input one or more of the points, such as a touch screen display, key board input, and/or light pens.

The control unit 240 may, although not necessarily, verify whether an attaching option is set through the input unit 260. If the attaching option is set, the control unit 240 controls the image forming unit 210 to attach and then copy (i.e., print) the remaining regions. If the attaching option is not set, the control unit 240 controls the image forming unit 210 so as to copy the image data as is, with the designated region left blank. That is, the control unit controls the image forming unit 210 to copy the image data, as the designated region is maintained intact.

The display unit 250 displays the whole operation of the image forming apparatus. In particular, the display unit 250 displays the process of scanning the document under the control of the control unit 240. The process of scanning the document may, although not necessarily, employ the minimum resolution among resolutions that can be supported by the display unit 250. Furthermore, the display unit 250 may display, with for example the minimum resolution, the image freely scanned by the scanning unit 220. According to an aspect, the display unit 250 may be a control panel, a monitor, or an LCD screen.

The input unit 260 receives inputs from the user. The input unit 260 may be a mouse, a button, a control panel, or a touch screen, although not limited thereto. The user sets the scan option in the input unit 260. The scan option may be a skip option to skip the designated region, and/or an attaching option to attach the remaining regions. The attaching option may be previously set by the user. Moreover, the user may designate the designated region through the input unit 260.

Figure 3:
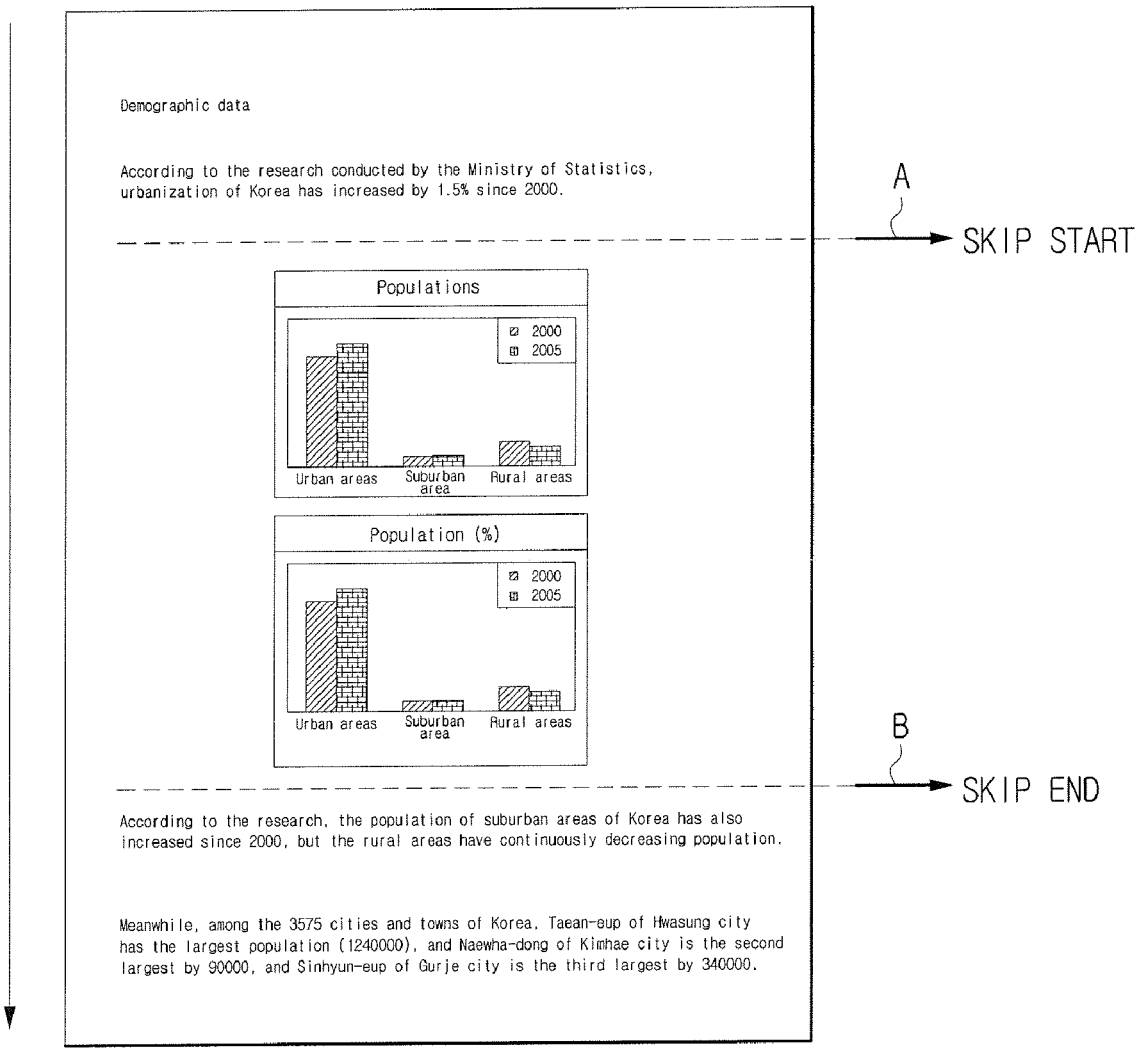
FIG. 3 is a view explaining a method of scanning a document according to an embodiment of the present invention.

FIG. 3 is a view explaining a method of scanning the document according to an embodiment of the present invention. Referring to FIG. 3, if the paper feeder mode of the document is the auto document feeder mode, the process of scanning the document may be displayed. As the document is scanned from an upper part to a lower part, the scanning operation from the point A, where the command to designate the skip region is primarily inputted, to the point B, where the command to designate the skip region is secondarily inputted, is skipped.

FIGS. 4A and 4B are views illustrating copied documents according to an embodiment of the present invention. Referring to FIG. 4A, the copied document where the designated region is skipped is output. More specifically, if the attaching option is not set, the skip copy is executed through the process of scanning the document, as shown in FIG. 3. As a result, the copied document in which a blank region C exists is output.

Referring to FIG. 4B, the copied document is output where the designated region is skipped and attached is output. More specifically, if the attaching option is set, the image data on which the skip copy is executed through the process of scanning the document, as shown in FIG. 3, is attached. As a result, the copied document in which a blank region D does not exist is output. As such, the skipped portion is removed and the remaining portions are attached as shown.

FIG. 5 is a flowchart explaining an image forming method according to an embodiment of the present invention. If a skip option is set to skip a designated region in a scan option at operation S510, the document is scanned to form image data, with the designated region of the document being skipped, at operation S520. The printing is performed according to the formed image data at operation S530. As such, since the region of which the copy is not desired by a user is skipped when the document is copied, the document can be copied without the user manually shielding a part of the document. If a skip option is not set at operation S510, the document is wholly scanned to form image data, and then the printing is performed at operation S540.

Figure 6:
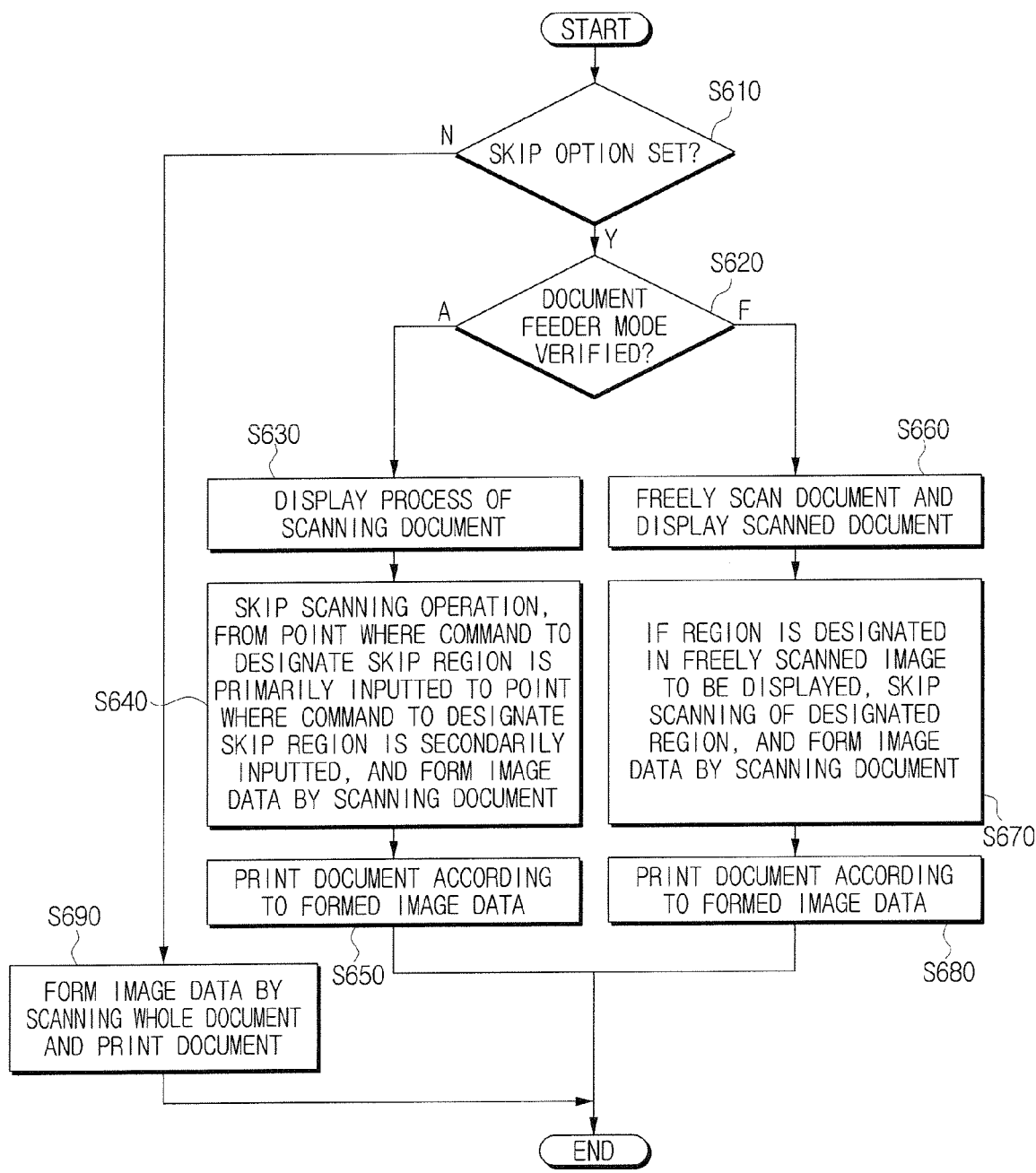
FIG. 6 is a flowchart explaining an image forming method according to another embodiment of the present invention.

FIG. 6 is a flowchart explaining an image forming method according to another embodiment of the present invention. If a skip option is set to skip a designated region in a scan option (Yes at operation S610), a document feeder mode is verified at operation S620. If the document feeder mode is an auto document feeder mode (A at operation S620), a process of scanning the document is displayed at operation S630. The scanning process may, although not necessarily, be displayed by applying the minimum resolution. The display can be a representation of a blank page on which the points are input, or can be an initial scan version of the document prior to the final image data being formed after the points are input.

If points of a skip region are primarily and secondarily inputted, the scanning operation from the point A where the command to designate the skip region is primarily inputted to the point B where the command to designate the skip region is secondarily inputted is skipped, and the document is scanned to form image data at operation S640. Then, the document is printed according to the image data at operation S650.

If the document feeder mode is a flat bed mode (F at operation S620), the document is freely scanned and then displayed at operation S660. The freely scanned image may, although not necessarily, be displayed by applying the minimum resolution. If a skip region is designated in the freely scanned image, the image data is formed with the designated region skipped at operation S670. Then, the document is printed according to the image data at operation S680. It is understood that according to an aspect, after the designated region is inputted, the document may be rescanned with designated region being skipped, or the image data excluding the designated region may be printed without rescanning the document.

Meanwhile, if the skip option is not set (N at operation S610), the document is wholly scanned. After the image data is formed, the document is printed at operation S690. Consequently, it can reduce the waste of resources, such as ink, by copying the document, except for the region of which the copy is not desired by the user. Also, on the sheet copy or auto document feed, a time required for the operation can be shortened by skipping the region of which the copy is not desired by the user through a simple manipulation.

Figure 7:
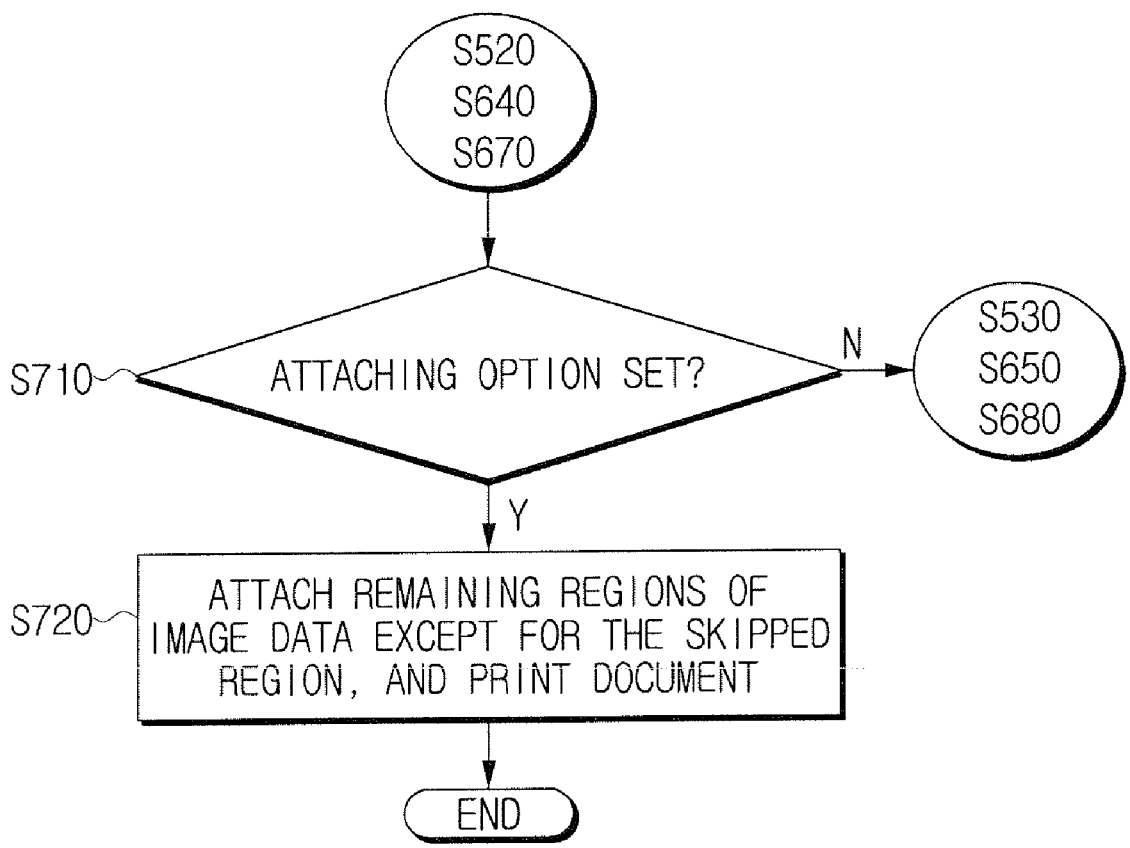
FIG. 7 is a flowchart explaining an attaching method according to an embodiment of the present invention.

FIG. 7 is a flowchart explaining an attaching method according to another embodiment of the present invention. Referring to FIG. 7, an attaching method may be applied to the skipped designated region after operation S520 of FIG. 5 and operations S640 and S670 of FIG. 6.

If an attaching option, which connects and copies the remaining regions except for the skipped region is set at operation S710 or previously, the remaining regions of the image data are attached to print the document at operation S720. As a result, printing medium can be saved. If the attaching option is not set (N at operation S710), operation S530 of FIG. 5 and operations S650 and S680 of FIG. 6 are carried out.

As described above, according to aspects of the present invention, a document can be copied while skipping a region on which copying is not desired by a user. Accordingly, resources, such as ink, can be preserved. Also, on the sheet copy or auto document feed, time required for the skip copy operation can be shortened by skipping the region on which copying is not desired by the user through a simple manipulation.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus comprising:
   an image forming unit to copy a document;
   an input unit to receive a command to designate a region to skip from a user, and
   a control unit to control the image forming unit to skip the designated region of the document and copy the other region according to a copy mode when the image forming unit copies the document;
   wherein, the region to skip is designated during scanning of the document when the copy mode is an auto document feeder mode, and, the region to skip is designated after scanning the whole document when the copy mode is a flat bed feeder mode.

2. The image forming apparatus as claimed in claim 1, wherein the image forming unit comprises:
   a scanning unit to scan the document and to form image data without the designated region; and
   a printing unit to print the image data.

3. The image forming apparatus as claimed in claim 2, wherein the control unit controls the printing unit to print the image data such that a first region and a second region of the document, surrounding the designated region, are attached.

4. The image forming apparatus as claimed in claim 3, wherein the input unit receives an input instructing the control unit to control the printing unit to print the image data such that the first region and the second region are attached.

5. The image forming apparatus as claimed in claim 2, wherein the auto document feeder mode is a mode during which the control unit controls the scanning unit to skip a scanning process of the designated region.

6. The image forming apparatus as claimed in claim 5, wherein the input unit receives a scan option setting such that: if the scan option setting is a skip option, then the control unit controls the image forming unit to skip the designated region of the document when the image forming unit copies the document; and if the scan option is not the skip option, then the control unit controls the image forming unit to copy the document without skipping.

7. The image forming apparatus as claimed in claim 2, wherein the flat bed mode is a mode during which the control unit controls the scanning unit to entirely scan the document.

8. The image forming apparatus as claimed in claim 2, wherein the input unit receives a first input to designate a first point of the designated region and a second input to designate a second point of the designated region.

9. The image forming apparatus as claimed in claim 8, wherein:
   the input unit receives the first input and the second input during an auto document feeder mode.

10. The image forming apparatus as claimed in claim 8, wherein:
    the input unit receives the first input and the second input during the auto document feeder mode; and
    the control unit controls the scanning unit to skip a scanning process of the designated region from the first point to the second point when the scanning unit scans the document.

11. The image forming apparatus as claimed in claim 8, wherein:
    the input unit receives the first input and the second input during the flat bed mode; and
    the control unit controls the scanning unit to form the image data without the designated region from the first point to the second point.

12. The image forming apparatus as claimed in claim 2, further comprising:
    a display unit to display a scanned document, which is an image of the document scanned by the scanning unit, prior to forming the image data.

13. The image forming apparatus as claimed in claim 12, wherein the display unit displays the scanned document with a minimum resolution from among supportable resolutions of the display unit.

14. The image forming apparatus as claimed in claim 12, wherein the control unit controls the scanning unit to entirely scan the document and to form the scanned document therefrom such that the input unit receives the location of the designated area in relation to the displayed scanned document during the flat bed mode.

15. The image forming apparatus as claimed in claim 14, wherein the display unit displays the entirely scanned document with a minimum resolution from among supportable resolutions of the display unit.

16. The image forming apparatus as claimed in claim 14, wherein the input unit receives a first input to designate a first point of the designated region on the displayed scanned document and a second input to designate a second point of the designated region on the displayed scanned document.

17. The image forming apparatus as claimed in claim 14, wherein:
    the control unit controls the scanning unit to rescan the document while skipping a rescanning process of the designated region and to form the image data therefrom.

18. An image forming method for copying a document, the method comprising:
    receiving a command to designate a region to skip in the document from a user;
    forming image data of the document without the designated region; and
    printing the formed image data, wherein
    the region to skip is designated during scanning of the document when a copy mode is an auto document feeder mode, and, the region to skip is designated after scanning the whole document when the copy mode is a flat bed feeder mode.

19. The image forming method as claimed in claim 18, wherein the forming of the image data comprises:

forming the image data such that the designated region is skipped when a skip option is set.

20. The image forming method as claimed in claim 18, wherein the auto document feeder mode is a mode during which the scanning of the document comprises skipping a scanning of the designated region on the document.

21. The image forming method as claimed in claim 18, wherein the receiving of the location of the designated region comprises:
receiving a first input to designate a first point of the designated region; and
receiving a second input to designate a second point of the designated region.

22. The image forming method as claimed in claim 21, wherein:
the receiving of the first input comprises receiving the first input during an auto document feeder mode; and
the receiving of the second input comprises receiving the second input during the auto document feeder mode.

23. The image forming method as claimed in claim 21, wherein:
the auto document feeder is a mode during which:
the receiving of the location of the designated region is performed during the scanning of the document; and
the scanning of the document comprises skipping a scanning of the designated region on the document from the first point to the second point.

24. The image forming method as claimed in claim 21, wherein:
the flat bed mode is a mode during which:
the receiving of the location of the designated region is performed after the scanning of the document;
the forming of the image data comprises forming the image data without the designated region from the first point to the second point.

25. The image forming method as claimed in claim 18, further comprising:
displaying a scanned document image, which is an image of the scanned document, after the scanning of the document and before the forming of the image data.

26. The image forming method as claimed in claim 25, wherein the displaying of the scanned document image comprises:
displaying the scanned document image with a minimum resolution from among supportable resolutions of a display unit.

27. The image forming method as claimed in claim 25, wherein:
the copy mode is the flat bed mode during which:
the scanning of the document comprises scanning an entirety of the document and forming the scanned document image therefrom;
the receiving of the location of the designated region is performed after the scanning of the document; and
the receiving of the location of the designated region comprises receiving the location of the designated area in relation to the displayed scanned document image.

28. The image forming method as claimed in claim 27, wherein the displaying of the scanned document image comprises:
displaying the scanned document image with a minimum resolution from among supportable resolutions.

29. The image forming method as claimed in claim 27, wherein the receiving of the location of the designated area in relation to the displayed scanned document image comprises:
receiving a first input to designate a first point of the designated region on the displayed scanned document image; and
receiving a second input to designate a second point of the designated region on the displayed scanned document image.

30. The image forming method as claimed in claim 27, further comprising:
rescanning the document, after receiving the location of the designated region, while skipping a rescanning of the designated region,
wherein the forming of the image data comprises forming the image data from the rescanned document.

31. The image forming method as claimed in claim 18, wherein the printing of the formed image data comprises:
printing the formed image data such that a first region and a second region of the document, surrounding the designated region, are attached.

32. The image forming method as claimed in claim 18, wherein the forming of the image data further comprises:
forming the image data with the designated region if a skip option is not set.

33. An image forming apparatus, comprising:
a scanning unit to scan the document and to form image data;
a printing unit;
a display unit to display the scanned document;
an input unit to receive an input to designate a region to skip in the displayed scanned document by a user; and
a control unit to control the printing unit to skip the designated region of the document and print the other region of the document when the document is copied,
wherein the control unit controls the scanning unit to entirely scan the document and to form the scanned document therefrom such that the input unit receives the location of the designated area in relation to the displayed scanned document,
wherein the input unit receives a first input to designate a first point of the designated region on the displayed scanned document and a second input to designate a second point of the designated region on the displayed scanned document.

34. An image forming apparatus, comprising:
a scanning unit to scan the document and to form image data;
a printing unit;
a display unit to display the scanned document;
an input unit to receive an input to designate a region to skip in the displayed scanned document by a user; and
a control unit to control the printing unit to skip the designated region of the document and print the other region of the document when the document is copied,
wherein the control unit controls the scanning unit to entirely scan the document and to form the scanned document therefrom such that the input unit receives the location of the designated area in relation to the displayed scanned document,
wherein the control unit controls the scanning unit to rescan the document while skipping a rescanning process of the designated region and to form the image data therefrom.

* * * * *